(12) United States Patent
Wei et al.

(10) Patent No.: US 7,992,380 B2
(45) Date of Patent: Aug. 9, 2011

(54) EMISSION CONTROL SYSTEM IMPLEMENTING REDUCTION AGENT INJECTION

(75) Inventors: Zhiyong Wei, Chicago, IL (US); Christopher Alan Sharp, San Antonio, TX (US)

(73) Assignee: Caterpillar Inc., Peoria, IL (US)

( * ) Notice: Subject to any disclaimer, the term of this patent is extended or adjusted under 35 U.S.C. 154(b) by 525 days.

(21) Appl. No.: 12/196,332

(22) Filed: Aug. 22, 2008

(65) Prior Publication Data

US 2009/0049827 A1    Feb. 26, 2009

Related U.S. Application Data

(60) Provisional application No. 60/935,654, filed on Aug. 23, 2007.

(51) Int. Cl.
*F01N 3/00* (2006.01)
*F01N 3/10* (2006.01)

(52) U.S. Cl. ............... 60/286; 60/295; 60/299; 60/301; 60/303

(58) Field of Classification Search ............. 60/286, 60/295, 299, 301, 303
See application file for complete search history.

(56) References Cited

U.S. PATENT DOCUMENTS

| | | |
|---|---|---|
| 4,314,345 A | 2/1982 | Shiraishi et al. |
| 5,833,932 A | 11/1998 | Schmelz |
| 6,125,629 A | 10/2000 | Patchett |
| 6,415,602 B1 | 7/2002 | Patchett et al. |
| 6,446,430 B1 | 9/2002 | Roth et al. |
| 6,536,210 B1 | 3/2003 | Komoriya et al. |
| 6,662,553 B2 | 12/2003 | Patchett et al. |
| 6,681,565 B2 | 1/2004 | Russell |
| 6,732,507 B1 | 5/2004 | Stanglmaier et al. |
| 6,823,660 B2 | 11/2004 | Minami |
| 6,826,906 B2 | 12/2004 | Kakwani et al. |
| 6,871,489 B2 | 3/2005 | Tumati et al. |
| 6,871,490 B2 | 3/2005 | Liang et al. |
| 6,882,929 B2 | 4/2005 | Liang et al. |
| 6,928,806 B2 | 7/2005 | Tennison et al. |
| 6,996,975 B2 | 2/2006 | Radhamohan et al. |

(Continued)

FOREIGN PATENT DOCUMENTS

WO    WO 2006/021748 A1    3/2006

OTHER PUBLICATIONS

Schar et al., "Control of a Urea SCR Catalytic Converter System for a Mobile Heavy Duty Diesel Engine," SAE International, 2003-01-0776, Mar. 3-6, 2003, 11 pages.*

(Continued)

*Primary Examiner* — Thomas E Denion
*Assistant Examiner* — Patrick Maines
(74) *Attorney, Agent, or Firm* — Finnegan, Henderson, Farabow, Garrett & Dunner LLP (57) ABSTRACT

An emissions control system is disclosed. The emissions control system may have a power source that creates a flow of exhaust, an SCR catalyst situated to receive the flow of exhaust, and an injector configured to inject a reduction agent into the flow of exhaust in the presence of the SCR catalyst. The emissions control system may further have a controller configured to calculate a spatially dependent surface coverage of the reduction agent on the SCR catalyst and substantially stop injection of the reduction agent when the spatially dependent surface coverage of the reduction agent exceeds a maximum surface coverage of the reduction agent at one or more spatial locations.

20 Claims, 3 Drawing Sheets

U.S. PATENT DOCUMENTS

| | | |
|---|---|---|
| 7,005,116 B2 | 2/2006 | Schäfer-Sindlinger et al. |
| 7,055,313 B2 | 6/2006 | Russell |
| 7,065,958 B2 | 6/2006 | Funk et al. |
| 7,150,145 B2 | 12/2006 | Patchett et al. |
| 7,155,331 B1 | 12/2006 | Zhang et al. |
| 7,168,947 B2 | 1/2007 | Zamansky et al. |
| 7,200,990 B2 | 4/2007 | Gabrielsson et al. |
| 2004/0093856 A1* | 5/2004 | Dingle et al. .......... 60/286 |
| 2006/0042234 A1 | 3/2006 | Song et al. |
| 2006/0045801 A1 | 3/2006 | Boyden et al. |
| 2006/0047366 A1 | 3/2006 | Boyden et al. |
| 2006/0086080 A1 | 4/2006 | Katogi et al. |
| 2006/0196285 A1 | 9/2006 | Steen et al. |
| 2007/0042495 A1 | 2/2007 | Pavlova-MacKinnon et al. |

OTHER PUBLICATIONS

Schar et al., "Mean,Value Model of the SCR System of a Mobile Application," IFAC, 15~ Triennial World Congress, Barcelona, Spain, 2002, 6 pages.*

Schär et al., "Mean-Value Model of the SCR System of a Mobile Application," IFAC, 15$^{th}$ Triennial World Congress, Barcelona, Spain, 2002, 6 pages.

Schär et al., "Control of a Urea SCR Catalytic Converter System for a Mobile Heavy Duty Diesel Engine," SAE International, 2003-01-0776, Mar. 3-6, 2003, 11 pages.

Schär et al., "Control-Oriented Model of an SCR Catalytic Converter System," SAE International, 2004-01-0153, Mar. 8-11, 2004, 14 pages.

Chi et al., "Modeling and Control of a Urea-SCR Aftertreatment System," SAE International, 2005-01-0966, Apr. 11-14, 2005, 18 pages.

Willems et al., "Is Closed-Loop SCR Control Required to Meet Future Emission Targets?" SAE International, 2007-01-1574, Apr. 16-19, 2007, 13 pages.

U.S. Appl. No. 11/882,218, filed Jul. 31, 2007, "SCR Emissions Control System," pp. 1-16, Figs. 1-2.

U.S. Appl. No. 11/892,132, filed Aug. 20, 2007, "Control of SCR System Having a Filtering Device," pp. 1-16, Figs. 1-4.

* cited by examiner

EMISSION CONTROL SYSTEM IMPLEMENTING REDUCTION AGENT INJECTION

RELATED APPLICATION

This application is based upon and claims the benefit of priority from U.S. Provisional Application No. 60/935,654 filed on Aug. 23, 2007, the entire contents of which are incorporated herein by reference.

TECHNICAL FIELD

The present disclosure relates generally to an emission control system and more particularly, to an emission control system that controls an injection of a reduction agent based on a surface coverage of the reduction agent on an SCR catalyst.

BACKGROUND

Control of engine exhaust emissions is becoming increasingly important for engine manufacturers. Governments and regulatory agencies are enforcing ever more stringent emissions standards for many types of on-highway and off-highway vehicles. The amount of pollutants in an exhaust flow emitted from the vehicle's engine may be regulated depending on the type, size, and/or class of engine. Accordingly, manufacturers must develop new technologies to meet these standards while providing high-performance, cost-effective equipment to consumers.

One method implemented by engine manufacturers to comply with the regulation of exhaust pollutants is the use of a selective catalytic reduction ("SCR") system to clean nitrogen oxides ("NOx") from the engine exhaust flow. An SCR system works by releasing a reduction agent, such as ammonia ("$NH_3$"), into the engine exhaust flow in the presence of a catalyst. The $NH_3$ may be stored on a surface coating of the catalyst where it reacts with the NOx in the exhaust flow to create environmentally friendly products, such as nitrogen gas ("$N_2$") and water ("$H_2O$"). The chemical reactions of the SCR process can be represented by:

$$NH_3(g) \leftrightharpoons NH_3(ads); \quad (1)$$

$$4NH_3(ads) + 4NO + O_2 \rightarrow 4N_2 + 6H_2O; \quad (2)$$

$$4NH_3(ads) + 2NO + 2NO_2 \rightarrow 4N_2 + 6H_2O; \quad (3)$$

$$8NH_3(ads) + 6NO_2 \rightarrow 7N_2 + 12H_2O; \quad (4)$$

$$4NH_3(ads) + 3O_2 \rightarrow 2N_2 + 6H_2O. \quad (5)$$

Reaction (1) describes the ammonia adsorption/desorption from the catalyst, Reactions (2)-(4) are "DeNOx" reactions that describe the reaction between the reduction agent and the NOx in the presence of the catalyst, and Reaction (5) describes the oxidation of the ammonia.

In general, manufactures seek to maximize the amount of NOx in the exhaust flow converted to $H_2O$ and $N_2$. To achieve this, the amount of $NH_3$ stored on the catalyst's surface may be increased. However, $NH_3$ may also be desorbed from the catalyst and carried by the exhaust flow downstream of the catalyst to a location where the $NH_3$ is released into the atmosphere. This situation is commonly referred to as $NH_3$ slip. $NH_3$ slip is undesirable because the unreacted $NH_3$ is released into the atmosphere and wasted. The $NH_3$ desorption rate is strongly dependent on the catalyst's temperature. As the temperature of the catalyst increases, the desorption rate of $NH_3$ from the catalyst's surface increases exponentially.

Unlike industrial or stationary SCR applications where engines or turbines generally operate at steady state conditions, mobile SCR systems used for on-highway trucks and off-road machines are subject to transient engine speeds and loads. The transient engine speeds and loads lead to a time varying exhaust temperature, and thus a time varying catalyst desorption rate. For example, a sudden increase in engine load and/or speed may create a sharp increase in the temperature of the exhaust flow. This sharp increase in the exhaust flow temperature may initially heat an inlet portion of the SCR catalyst and significantly increase desorption of the stored reduction agent at the inlet portion. The desorbed reduction agent may be carried downstream and reabsorbed in a cooler downstream portion of the SCR catalyst. As the temperature increase continues to propagate down the length of the SCR catalyst, the reduction agent may correspondingly continue to desorb from the heated portion of the SCR catalyst (the length of which is increasing) and reabsorb in the cooler downstream portion of the SCR catalyst (the length of which is decreasing) until the cooler downstream portion of the SCR catalyst no longer has sufficient capacity to absorb the reduction agent and slip occurs. Automatic control has been used as one method of attempting to handle transient changes in the exhaust flow temperature and desorption rate, while still maintaining a good NOx conversion and avoid slip.

One example of controlling an SCR process is described in SAE paper 2003-01-0776, "Control of a Urea SCR Catalytic Converter System for a Mobile Heavy Duty Diesel Engine" (the '0776 paper) by C. M. Schär et al. Specifically, the '0776 paper discloses a feedforward controller with a surface coverage observer used in conjunction with a feedback controller. The feedforward controller determines an amount of ammonia to be injected using a two-dimensional look-up table and an estimated molar flow of NOx.

The surface coverage observer includes a model of the SCR catalyst and acts as the memory of the feedforward controller. The surface coverage observer includes two cells arranged in series that are used to calculate the surface coverage on an area of the catalytic converter that each cell represents. A maximum surface coverage value for the first cell is determined using a look-up table and is compared to the calculated surface coverage for the first cell. If the calculated surface coverage value is greater than the maximum surface coverage, the surface coverage observer reduces the amount of ammonia to be injected by a given value. The output of the feedforward controller (i.e., the amount of ammonia to be injected) and the output of the feedback controller are then multiplied and sent to the extended plant, which includes the plant itself.

Although the '0776 paper may help reduce slip using a plurality of computational cells, the controller of the '0776 paper may still be suboptimal. For example, a sudden increase in engine load and/or speed may create a sharp increase in the temperature of the exhaust flow and significantly increase desorption of the stored reduction agent. Due to the rapid speed at which the heated exhaust flow may travel, reducing injection of the reduction agent short of completely stopping injection may be insufficient to prevent slip.

Furthermore, the '0776 paper does not disclose how the two cells are oriented relative to the catalytic converter and the exhaust flow direction (e.g., whether they are in series but oriented perpendicular to the flow direction of the exhaust, in series with the first cell near the inlet, in series with the first cell near the outlet, or some other orientation). Moreover, using only two computational cells may be suboptimal. For example, locating the first cell at the outlet of the catalytic converter may lead to overly conservative slip control. By the time that the controller detects a surface coverage at the outlet that is higher than the maximum surface coverage, and commands a reduction in the injected ammonia, slip may have already occurred due to the proximity of the computational cell to the outlet. Conversely, locating the first cell at the inlet of the catalytic converter may lead to overly aggressive slip control since the desorbed ammonia from the inlet computational cell may be reabsorbed into the catalyst downstream of the inlet before it results in slip. This overly aggressive slip control may decrease an NOx conversion efficiency. Similar problems exist for other possible orientations of the two cells. Control systems with only two computational cells also may not have the spatial resolution required to accurately detect the effects of a temperature wave in the catalytic converter.

The present disclosure is directed at overcoming one or more of the problems set forth above.

SUMMARY OF THE DISCLOSURE

In one aspect, the present disclosure is directed to an emissions control system. The emissions control system may include a power source that creates a flow of exhaust, an SCR catalyst situated to receive the flow of exhaust, and an injector configured to inject a reduction agent into the flow of exhaust in the presence of the SCR catalyst. The emissions control system may further include a controller configured to calculate a spatially dependent surface coverage of the reduction agent on the SCR catalyst and substantially stop injection of reduction agent when the spatially dependent surface coverage exceeds a maximum surface coverage of the reduction agent at one or more spatial locations.

In another aspect, the present disclosure is directed to a method of controlling an SCR process. The method may include generating a flow of exhaust, communicating the flow of exhaust to an SCR catalyst, and injecting a reduction agent into the flow of exhaust for reaction with the flow of exhaust in the presence of the SCR catalyst. The method may further include calculating a spatially dependent surface coverage of reduction agent on the SCR catalyst and substantially stopping injection of the reduction agent when the spatially dependent surface coverage of the reduction agent exceeds a maximum surface coverage of the reduction agent at one or more spatial locations.

DETAILED DESCRIPTION

Figure 1:
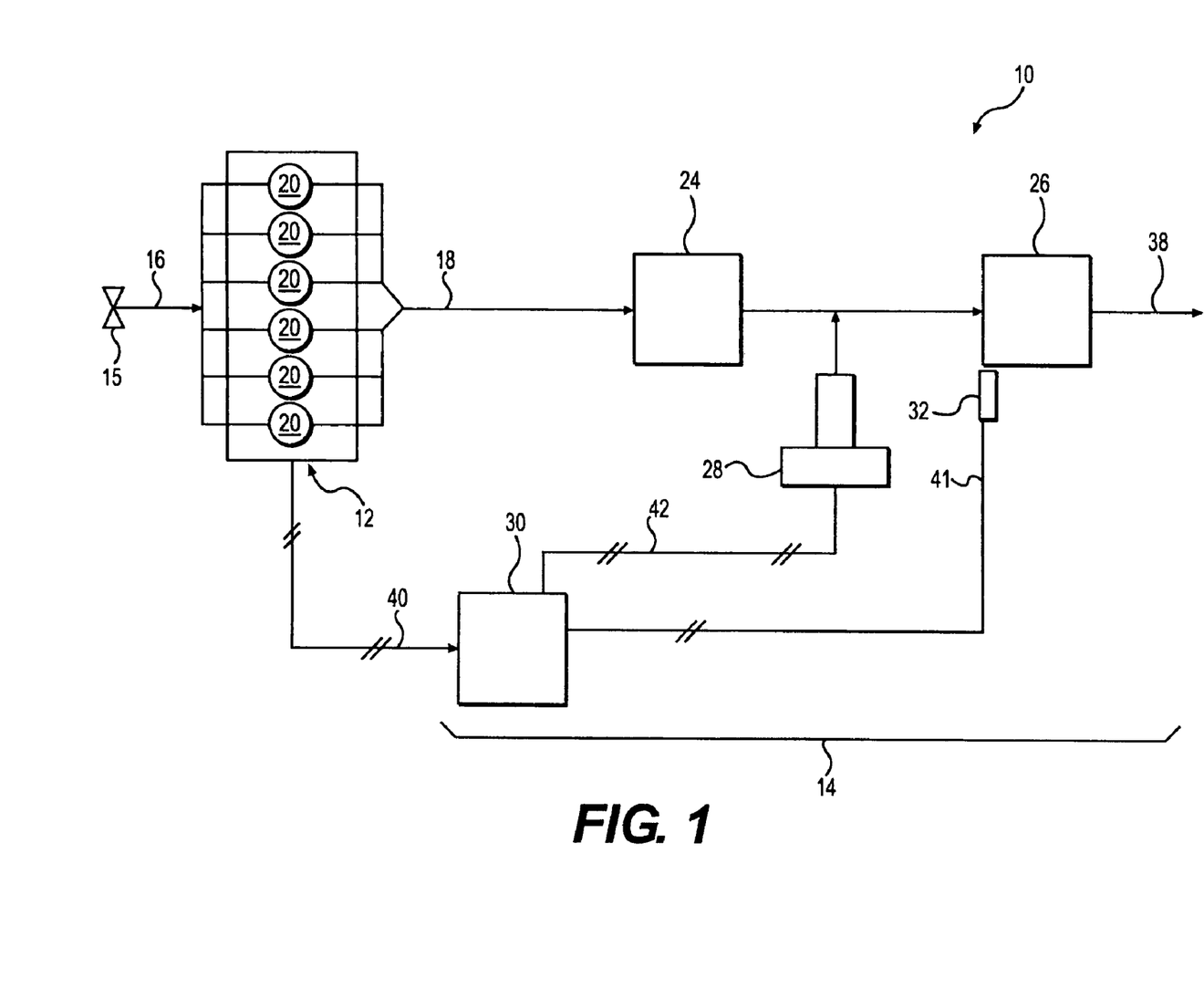
FIG. 1 is a diagrammatic illustration of an exemplary disclosed fluid system.

FIG. 1 illustrates a diagrammatic representation of a fluid system 10, including a power source 12 and an emissions control system 14. Power source 12 may embody a combustion engine, such as, for example, a diesel engine, a gasoline engine, a gaseous fuel-powered engine (e.g., a natural gas engine), or any other type of combustion engine known to one skilled in the art. It is also considered that power source 12 may embody a furnace or a similar non-engine device. Power source 12 may have a plurality of combustion chambers 20 that convert potential chemical energy (usually in the form of a combustible gas) into useful mechanical work. Power source 12 may receive air via a passageway 16 and may output an exhaust flow via a passageway 18.

Air may enter fluid system 10 via an induction valve 15. Induction valve 15 may embody a butterfly valve, a gate valve, a ball valve, a globe valve, or any other type of valve known in the art. Induction valve 15 may be solenoid-actuated, hydraulically-actuated, pneumatically-actuated, or actuated in any other manner. Induction valve 15 may fluidly communicate with passageway 16 to direct air into power source 12.

Emissions control system 14 may reduce emissions of regulated gasses and particulate matter emitted from power source 12 during a combustion process. Emissions control system 14 may include a filtering device 24, a selective catalytic reduction ("SCR") device 26, an injector 28, a sensor 32, and a controller 30. It is contemplated that emissions control system 14 may include other devices, such as, for example, a diesel oxidation catalyst, an ammonia oxidation catalyst, additional injectors and/or filters, and other devices known in the art.

Filtering device 24 may filter particulate matter and/or chemicals from the exhaust flow before the flow is released into the atmosphere via a passageway 38. Filtering device 24 may embody, for example, a diesel particulate filter, a catalyzed diesel particulate filter, a diesel oxidation catalyst, a CRT™, or a CCRT™. Filtering device 24 may contain filtering elements (not shown), arranged in a honeycomb, mesh, and/or other suitable configuration. The filtering elements of filtering device 24 may be composed of any appropriate filter material known in the art, such as, for example, foam cordierite, sintered metal, paper, ceramic, silicon carbide, or any combination thereof.

The filtering elements of filtering device 24 may also have an active catalyst layer comprised of any suitable catalytic material, such as, for example, platinum, aluminum, palladium, rhodium, barium, cerium, alkali metals, alkaline-earth metals, rare-earth metals, or any combinations thereof. As the exhaust flow interacts with the catalyst, hydrocarbons and/or other chemicals in the exhaust flow may be oxidized. The catalyst material in filtering device 24 may also increase the amount of $NO_2$ in the exhaust flow to improve a passive regeneration capacity and an NOx reduction efficiency. It is also considered that filtering device 24 may be passively or actively regenerated to remove the particulate matter from the filtering elements of filtering device 24.

SCR device 26 may be a flow-through device configured to catalyze a reaction between exhaust NOx and a reduction agent. SCR device 26 may include an SCR catalyst, such as, for example, a zeolite type catalyst, a vandium type catalyst, or any other appropriate catalyst type known in the art. The SCR catalyst may include a support material and a metal promoter dispersed within the catalyst support material. The catalyst material may be chosen based on the type of fuel used, the ethanol additive used, the air to fuel-vapor ratio desired, and/or for conformity with environmental standards.

Injector 28 may inject a reduction agent to dose the surface of SCR device 26. Injector 28 may be located at or upstream of SCR device 26 and may embody any type of fluid injector known in the art. Injector 28 may fluidly communicate with a reduction agent supply tank (not shown) to provide for repeated injections of the reduction agent. The reduction agent may be, for example, gaseous ammonia, ammonia in aqueous solution, aqueous urea, or ammonia from an ammonia generator (not shown).

Sensor 32 may be a device configured to measure a temperature of emissions control system 14. Sensor 32 may be, for example, a thermocouple, a fiber optic device, an infrared device, or any other temperature sensing device known in the art. Sensor 32 may be located at or upstream of SCR device 26 and may be configured to measure a temperature of the SCR catalyst or of the exhaust flow near the SCR catalyst.

Controller 30 may embody a single microprocessor or multiple microprocessors that control the operation of emissions control system 14 (e.g., control an amount of reduction agent injected by injector 28). Numerous commercially available microprocessors may be configured to perform the functions of controller 30. It should be appreciated that controller 30 may readily embody a general machine microprocessor capable of controlling numerous machine functions. In addition, various other circuits may be associated with controller 30, such as power supply circuitry, signal conditioning circuitry, data acquisition circuitry, signal output circuitry, signal amplification circuitry, and other types of circuitry known in the art. Controller 30 may communicate with power source 12 via a communication line 40, sensor 32 via a communication line 41, and injector 28 via a communication line 42. It is contemplated that controller 30 may communicate with other machine sensors (not shown), such as NOx sensors, $NH_3$ sensors, mass flow rate sensors, additional temperature sensors, and/or any other sensors that may provide information related to the operational characteristics of emissions control system 14.

Figure 2:
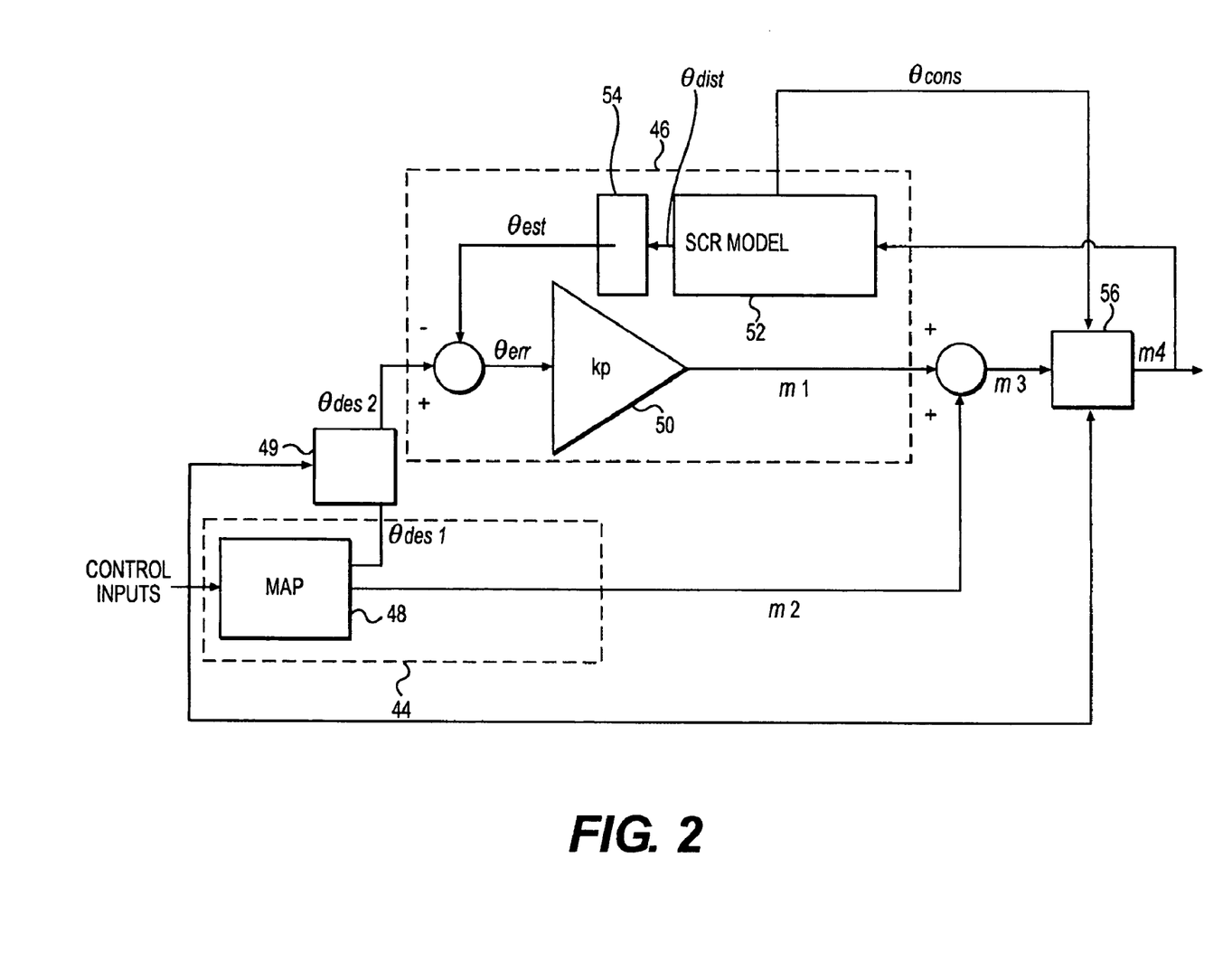
FIG. 2 is a control diagram depicting an exemplary control structure used in the control system of FIG. 1.

Controller 30 may include internal logic/programming that allows it to calculate one or more outputs, given one or more inputs. One example of the internal logic/programming is depicted in the diagram of FIG. 2. The logic/programming of controller 30 may define a first feedforward control structure 44, a first algorithm 49, a second feedforward control structure 46, and a second algorithm 56.

First feedforward control structure 44 may be, for example, a map-based control structure. First feedforward control structure 44 may receive multiple control inputs, such as, for example, an SCR catalyst temperature measured by sensor 32, a space velocity, an $NO_2/NOx$ ratio at an SCR device inlet, and other measured and/or calculated quantities usable for fluid system control. The first feedforward control system outputs may include a desired catalyst surface coverage (e.g., θdes1) and a second injection amount of reduction agent m2. In general, a catalyst surface coverage θ may be the fraction of active sites on the surface of the SCR catalyst that are covered by molecules of reduction agent (e.g., molecules of $NH_3$).

First feedforward control structure 44 may utilize one or more multi-dimensional maps 48 stored within the memory of controller 30. Maps 48 may be generated from steady-state simulations and/or empirical data and may include equations, graphs and/or tables related to the operational characteristics of fluid system 10. For example, maps 48 may include equations, graphs and/or tables that relate the SCR catalyst temperature to an ability of the SCR catalyst to store reduction agent.

Figure 3:
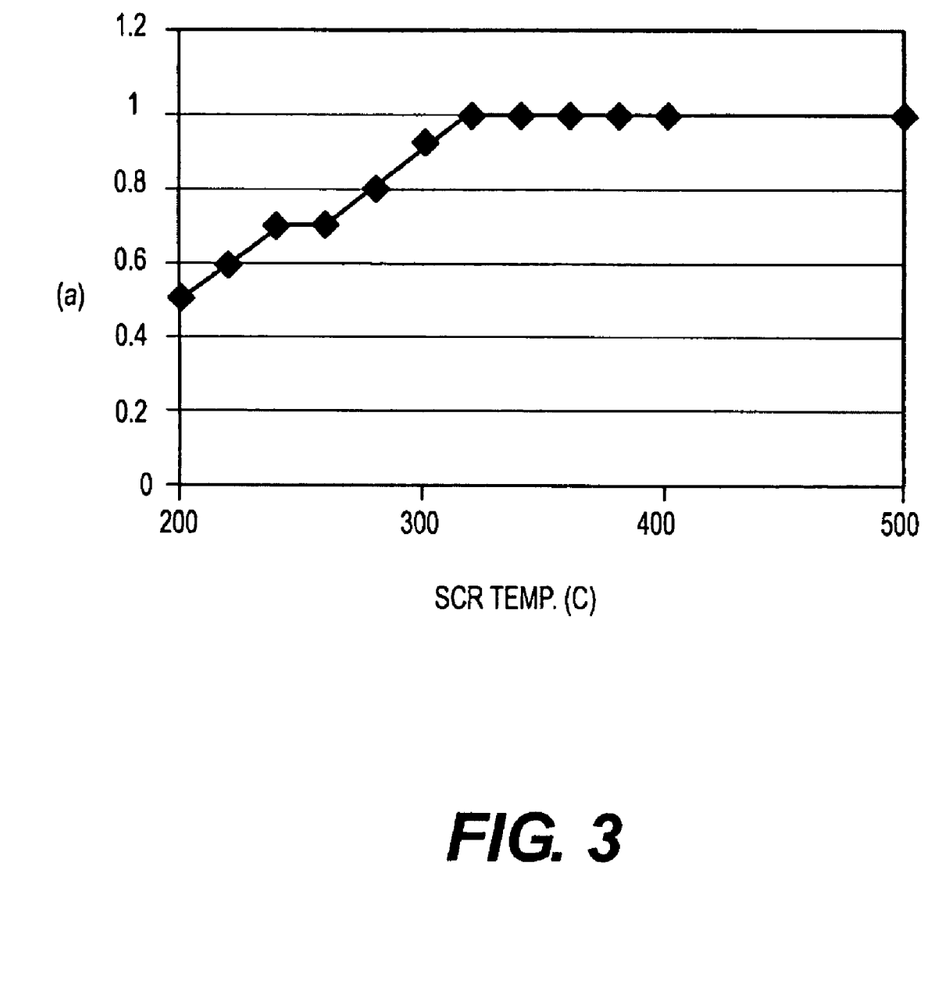
FIG. 3 is a graph relating an exemplary scaling factor to a temperature of an SCR catalyst used in the disclosed fluid system of FIG. 1.

First algorithm 49 may be configured to reduce the desired catalyst surface coverage when the SCR catalyst is at low temperatures (e.g., temperatures below approximately 300 degrees C.). The inputs of first algorithm 49 may include θdes1 and the control inputs. In one embodiment, first algorithm 49 may use a table, relationship, or function (as shown in FIG. 3) to determine a scaling factor a using the temperature of the SCR catalyst. θdes1 may be multiplied by the scaling factor a to produce θdes2. It is contemplated that the value for a may range from zero to one. It is further contemplated that the table, relationship, or function of first algorithm 49 may be derived from empirical data and/or computer simulations.

Second feedforward control structure 46 may be a model-based control structure, such as, for example, a virtual state feedback controller. Second feedforward control structure 46 may have a proportional gain 50, an SCR model 52, and a combination block 54.

SCR model 52 may include solutions to a plurality of differential equations that describe the SCR process (including Reactions (1)-(5)). The differential equations may be solved for the catalyst surface coverage θ. The plurality of differential equations may include rate equations, thermal and mass transport equations, and other equations well known in the art. For example, the equations may take the form:

$$\Omega \frac{d\theta}{dt} = R_{ads} - R_{des} - R_{NO} - R_{NO+NO_2} - R_{NO_2} - R_{ox} \quad (6)$$

$$0 = -u\frac{dC_{NH_3}}{dz} + V_{wc/void}(R_{des} - R_{ads}) \quad (7)$$

$$0 = -u\frac{dC_{NO}}{dz} - V_{wc/void}(R_{NO} + 0.5R_{NO+NO_2}) \quad (8)$$

$$0 = -u\frac{dC_{NO_2}}{dz} - V_{wc/void}(0.75R_{NO_2} + 0.5R_{NO+NO_2}) \quad (9)$$

$$(1-\varphi_1)\rho_s c_{P,s}\frac{\partial T}{\partial t} = -\varphi_1 \rho_g c_{P,g} u \frac{\partial T}{\partial z} \quad (10)$$

where C is a species concentration, c is a specific heat, Ω is the $NH_3$ storage capacity of the catalyst, R represents a reaction rate source term, $V_{wc/void}$ is a geometric constant, u is the exhaust flow velocity, T is a temperature, z is a spatial coordinate, ρ is a density, t is time, and φ is a void fraction. The subscripts "g" and "s" represent solid and gas, respectively. It is contemplated that the plurality of differential equations may include additional and/or different equations or terms.

SCR model 52 may be discretized over a plurality of control volumes or computational cells mapped along a length of the SCR catalyst within SCR device 26. The first computational cell may correspond to the inlet of SCR device 26, and the last computational cell may correspond to an outlet of SCR device 26 (the remaining computational cells being located consecutively between the first and last). It is contemplated that SCR model 52 may be discretized using finite element, finite difference, and/or any other discretization method known in the art. It is also contemplated that SCR model 52 may be only partially discretized or entirely continuous. The number of computational cells may be optimized to best balance the SCR model's spatial resolution and computational speed.

The differential equations of SCR model 52 (e.g., Equations (6)-(10)) may be decoupled using an approximation. The approximation may dictate that an equal molar amount of NO and $NO_2$ goes through Reaction (3) until the reaction is complete. Once Reaction (3) is complete, the NO or $NO_2$ that was not included in the equal molar amount may go through either Reaction (2) or Reaction (4), depending on whether there is initially (i.e., prior to Reaction (3)) a larger molar amount of NO or $NO_2$. For example, when the initial molar amount of NO exceeds the initial amount of $NO_2$, the approximation may dictate that an equal molar amount of NO and $NO_2$ follow Reaction (3). Subsequently, there may be a remaining quantity of NO that was not involved in Reaction (3). According to the approximation, this remaining quantity of NO may thereafter follow Reaction (2). Alternatively, when the initial molar amount of $NO_2$ is greater than the initial amount of NO, the approximation may dictate that after Reaction (3), the remaining $NO_2$ follows Reaction (4).

In other words, the approximation may assume that Reactions (2)-(4) occur in series (e.g., Reaction (3) occurs first, followed by Reaction (2) or Reaction (4)) rather than in parallel (e.g., Reactions (2)-(4) occur simultaneously). This approximation may accurately describe the reaction process because Reaction (3) may be kinetically faster than Reactions (2) and (4). It is contemplated that SCR model 52 may be solved using any analytical and/or numerical method known in the art. It is also contemplated that the decoupling approximation may be omitted.

SCR model 52 may output θdist, which may represent a spatially dependent surface coverage of reduction agent on the SCR catalyst. For example, when SCR model 52 is in a discrete form, θdist may be an array or a matrix including a reduction agent surface coverage value for each computational cell (each computational cell corresponding to a spatial location or region on the SCR catalyst). SCR model 52 may communicate θdist to combination block 54.

Combination block 54 may combine the surface coverage distribution into a single representative value, θest. For example, combination block 54 may perform a straight average of the surface coverage values at each computational cell to calculate θest. It is contemplated that combination block 54 may employ other averaging techniques (e.g., weighted averaging) and/or combination techniques known in the art. θest may be compared to θdes to determine θerr (θerr may be the surface coverage error that controller 30 may attempt to minimize). θerr may be multiplied by proportional gain 50 to determine a first injection amount m1, which is combined with the second injection amount m2 to create a third injection amount m3. m2 may be a base injection amount that is modified by m1 (m1 may be either positive or negative) to arrive at m3. The value of m3 may be communicated to second algorithm 56.

Second algorithm 56 may compare the spatially dependent surface coverage of reduction agent to an associated maximum surface coverage of reduction agent at one or more constrained computational cells, θcons, and reduce a fourth injection amount of reduction agent, m4, to prevent slip. Second algorithm 56 may particularly be designed to prevent slip when power source 12 experiences a sudden increase in load and/or speed. For example, when the spatially dependent surface coverage of reduction agent exceeds the maximum surface coverage of reduction agent (at the constrained computational cell), second algorithm 56 may reduce the value m4 (i.e., the value of m4 may be less than the value of m3). It is contemplated that the value of m4 may also be set to zero, thus stopping or substantially stopping injection of the reduction agent. It is also contemplated that the location of the constrained computational cells may be selected a priori. To improve an ability of controller 30 to reduce slip, the constrained computational cells may be selected at a location greater than one fourth but less than one half the distance from an inlet end of the SCR catalyst. The maximum surface coverage for each of the constrained computational cells may be a predetermined constant or may be a variable calculated using the control inputs.

Controller 30 may command injector 28 to inject m4. It is contemplated that each injection amount may be a function of time (i.e., an injection rate). It is further contemplated that controller 30 may implement other control structures and/or methods in place of or in addition to second feedforward control structure 46 and first feedforward control structure 44.

INDUSTRIAL APPLICABILITY

The disclosed control system may be applicable to any fluid system where control of an SCR process is desired. Specifically, the disclosed control system may have a controller that calculates a spatially dependent surface coverage of reduction agent on the SCR catalyst and stops the injection of the reduction agent when the spatially dependent surface coverage of the reduction agent exceeds a maximum surface coverage of the reduction agent at one or more spatial locations. By stopping injection of the reduction agent, the disclosed control system may help limit the amount of pollutants in the exhaust flow while also limiting slip.

Referring to FIG. 1, atmospheric air may be drawn into fluid system 10 via induction valve 15 and communicated via passageway 16 to power source 12. Fuel may be mixed with the air before or after entering combustion chambers 20, and the fuel-air mixture may be combusted by power source 12 to produce mechanical work and exhaust flow. The exhaust flow may contain a complex mixture of air pollutants and particulate matter.

The exhaust flow may be communicated via passageway 18 to filtering device 24. While inside filtering device 24, the exhaust flow may pass through the one or more filtering elements to remove particulate matter from the exhaust flow. The exhaust flow may also pass through the catalyst layers of filtering device 24, thus causing hydrocarbons and/or other chemicals in the exhaust flow to be oxidized. The particulate matter deposited on the filtering elements of filtering device 24 may be passively or actively regenerated.

The exhaust flow exiting filtering device 24 may be communicated to SCR device 26 to reduce NOx in the exhaust flow. Sensor 32 may be located at or upstream of SCR device 26 to measure the temperature of the SCR catalyst or of the exhaust flow near the SCR catalyst. Controller 30 may be configured to command injector 28 to inject reduction agent into the exhaust flow (at or upstream of SCR device 26). Controller 30 may include programming that allows it to selectively actuate injector 28.

FIG. 2 shows an exemplary configuration of the internal logic/programming of controller 30. Control of emissions control system 14 may begin when first feedforward control structure 44 receives the control inputs. Controller 30 may reference the control inputs to maps 48 to obtain θdes1 and m2. θdes1 and the control inputs, including the SCR catalyst temperature measured by sensor 32, may then be fed into first algorithm 49. First algorithm 49 may be configured to prevent slip by reducing the desired surface coverage at low SCR catalyst temperatures. For example, when the SCR catalyst temperature (or a temperature of the nearby exhaust flow) is below approximately 300 degrees C., first algorithm 49 may use the scaling factor function (as shown in FIG. 3) to determine a. First algorithm 49 may multiply θdes1 by a to obtain θdes2. θdes2 may be fed into second feedforward control structure 46 where it may be compared to θest to obtain θerr. θerr may be multiplied by proportional gain 50, to obtain m1, which may then be summed with m2 to obtain m3, the third injection amount of reduction agent. The value of m3 may be fed into second algorithm 56 to determine the value of m4, which may be injected by injector 28.

After the reduction agent is injected by injector 28 it may be stored on the surface of the SCR catalyst, where it may be available for reaction with the NOx in the exhaust flow. When the reduction agent is a compound such as urea, it may undergo a hydrolysis process prior to being stored on the surface of the SCR catalyst. During the hydrolysis process, the urea may decompose into byproducts, including, for example, gaseous $NH_3$ and carbon dioxide.

During operation of emissions control system 14, the speed and/or load of power source 12 may increase rapidly. The rapid increase in the speed and/or load of power source 12 may cause a rapid increase in the temperature of the exhaust flow and may ultimately create a wave of desorption and absorption of reduction agent that travels down the length of the SCR catalyst, potentially resulting in slip. To prevent this slip, the value of m4 may be fed back into SCR model 52 to allow for calculation of θdist and θcons.

In an exemplary configuration, SCR model 52 may have four computational cells. θdist, which may contain an array of four surface coverage values, may be sent to combination block 54 where it is averaged into a single representative value, θest. θcons may be, for example, the surface coverage of the reduction agent at an interior computational cell (e.g., the second computational cell). θcons may be compared to the maximum surface coverage of reduction agent for the second computational cell, where the maximum surface coverage is a function of the SCR catalyst temperature. When the value of θcons exceeds the maximum surface coverage value, second algorithm 56 may set the value of m4 to zero. Setting the value of m4 to zero may stop or substantially stop the injection of the reduction agent, thus preventing slip when exhaust conditions change at a rate that exceeds the first and second feedforward control structure's ability to adequately respond.

Several advantages of the disclosed control system may be realized. For example, the disclosed control system may calculate a spatially dependent surface coverage of reduction agent on the SCR catalyst and stop the injection of the reduction agent when the spatially dependent surface coverage of the reduction agent exceeds a maximum surface coverage of the reduction agent. By stopping the injection of the reduction agent, the disclosed control system may help limit the amount of pollutants in the exhaust flow while also limiting slip. The disclosed controller may also use a sufficient number of computational cells along the flow direction of the SCR catalyst to detect a wave of desorption and absorption traveling through the SCR catalyst in order to reduce injection of the reduction agent accordingly.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. An emissions control system, comprising:
   a power source that creates a flow of exhaust;
   an SCR catalyst situated to receive the flow of exhaust;
   an injector configured to inject a reduction agent into the flow of exhaust in the presence of the SCR catalyst; and
   a controller configured to:
   calculate a spatially dependent surface coverage of the reduction agent on the SCR catalyst;
   substantially stop injection of the reduction agent when the spatially dependent surface coverage of the reduction agent exceeds a maximum surface coverage of the reduction agent at one or more spatial locations.

2. The emissions control system of claim 1, wherein injection of the reduction agent is substantially stopped to prevent slip.

3. The emissions control system of claim 1, wherein calculating includes using a plurality of computational cells to calculate the spatially dependent surface coverage, each of the plurality of computational cells corresponding to a spatial location of the SCR catalyst.

4. The emissions control system of claim 1, wherein a model based control structure is used to calculate the spatially dependent surface coverage, and the model based control structure uses a decoupling approximation to help solve a plurality of SCR equations.

5. The emissions control system of claim 1, further including a filtering device located upstream of the SCR catalyst and a temperature sensor located at the SCR catalyst.

6. A method of controlling an SCR process, comprising:
   generating a flow of exhaust;
   communicating the flow of exhaust to an SCR catalyst;
   injecting a reduction agent into the flow of exhaust for reaction with the flow of exhaust in the presence of the SCR catalyst;
   calculating a spatially dependent surface coverage of the reduction agent on the SCR catalyst; and
   substantially stopping injection of the reduction agent when the spatially dependent surface coverage of the reduction agent exceeds a maximum surface coverage of the reduction agent at one or more spatial locations.

7. The method of claim 6, wherein substantially stopping the injection of the reduction agent is performed to prevent slip.

8. The method of claim 6, wherein calculating includes using a plurality of computational cells to calculate the spatially dependent surface coverage, each of the plurality of computational cells corresponding to a spatial location of the SCR catalyst.

9. The method of claim 8, wherein:
   the plurality of computational cells is incrementally ordered and linearly arranged, the first of the computational cells corresponding to an inlet of the SCR catalyst, the last of the computational cells corresponding to an outlet the SCR catalyst, and a constrained computational cell located more than one fourth but less than one half the distance from the inlet end of the SCR catalyst; and
   the injection is substantially stopped when the spatially dependent surface coverage at the constrained computational cell exceeds a maximum surface coverage of reduction agent for the constrained computational cell.

10. The method of claim 9, wherein the maximum surface coverage for the constrained computational cell depends on the SCR catalyst temperature.

11. The method of claim 6, wherein calculating further includes:
    determining a second surface coverage;
    modifying the second surface coverage based on a temperature of the SCR catalyst; and
    using the second surface coverage and the spatially dependent surface coverage to determine an amount of the reduction agent.

12. The method of claim 11, wherein modifying includes multiplying the second surface coverage by a scaling factor, wherein the value of the scaling factor changes as a function of the SCR catalyst temperature, the value of the scaling factor being between zero and one.

13. The method of claim 6 wherein a model based control structure is used to calculate the spatially dependent surface coverage.

14. The method of claim 13, wherein the model based control structure includes a decoupling approximation used to help solve a plurality of SCR equations.

15. A method of controlling an SCR process, comprising:
    generating a flow of exhaust;
    communicating the flow of exhaust to an SCR catalyst;

injecting a reduction agent into the flow of exhaust for reaction with the flow of exhaust in the presence of the SCR catalyst;

calculating a spatially dependent surface coverage of the reduction agent on the SCR catalyst using at least four linearly arranged computational cells that represent spatial locations of the SCR catalyst; and reducing the injection of the reduction agent when the spatially dependent surface coverage of the reduction agent exceeds a maximum surface coverage of the reduction agent at one or more interior computational cells.

16. The method of claim 15, wherein reducing injection of the reduction agent is performed to prevent slip.

17. The method of claim 15, wherein:
the spatially dependent surface coverage is calculated using four computational cells;
a first of the four computational cells corresponds to an inlet of the SCR catalyst;
a fourth of the four computational cells corresponds to an outlet the SCR catalyst; and
the maximum surface coverage of the reduction agent is set at a second of the four computational cells, all the computational cells being consecutive.

18. The method of claim 15 wherein a model based control structure is used to calculate the spatially dependent surface coverage, and the model based control structure includes a decoupling approximation used to help solve a plurality of SCR equations.

19. The method of claim 15, wherein calculating further includes:
determining a second surface coverage of reduction agent;
modifying the second surface coverage of reduction agent based on a temperature of the SCR catalyst; and
using the second surface coverage and the spatially dependent surface coverage to determine an amount of reduction agent.

20. The method of claim 19, wherein modifying includes multiplying the second surface coverage by a temperature dependent scaling factor, the scaling factor being between zero and one inclusive.

* * * * *